(12) United States Patent
Park

(10) Patent No.: US 12,338,173 B2
(45) Date of Patent: Jun. 24, 2025

(54) METHOD OF MANUFACTURING ENVIRONMENTALLY FRIENDLY INTERIOR AND EXTERIOR BUILDING MATERIALS USING AGRICULTURAL WASTE OF LIGNOCELLULOSE-CONTAINING HERBACEOUS PLANT AND MINERAL BINDER AND ENVIRONMENTALLY FRIENDLY INTERIOR AND EXTERIOR BUILDING MATERIALS MANUFACTURED BY THE SAME

(71) Applicant: Mi Ja Park, Gimpo-si (KR)

(72) Inventor: Mi Ja Park, Gimpo-si (KR)

( * ) Notice: Subject to any disclaimer, the term of this patent is extended or adjusted under 35 U.S.C. 154(b) by 447 days.

(21) Appl. No.: 18/007,751

(22) PCT Filed: May 24, 2021

(86) PCT No.: PCT/KR2021/006426
§ 371 (c)(1),
(2) Date: Dec. 2, 2022

(87) PCT Pub. No.: WO2021/246699
PCT Pub. Date: Dec. 9, 2021

(65) Prior Publication Data
US 2024/0034676 A1    Feb. 1, 2024

(30) Foreign Application Priority Data

Jun. 5, 2020  (KR) .................. 10-2020-0068188

(51) Int. Cl.
| C04B 18/24 | (2006.01) |
| C04B 20/02 | (2006.01) |
| C04B 20/04 | (2006.01) |
| C04B 111/00 | (2006.01) |

(52) U.S. Cl.
CPC ............ *C04B 18/24* (2013.01); *C04B 20/026* (2013.01); *C04B 20/04* (2013.01); *C04B 2111/00017* (2013.01); *C04B 2111/00422* (2013.01)

(58) Field of Classification Search
CPC ....... C04B 18/24; C04B 20/026; C04B 20/04; C04B 28/00; C04B 28/32; C04B 28/005; C04B 18/248; C04B 2111/00017; C04B 2111/00422; B09B 3/00; E04C 2/26; Y02W 30/50
See application file for complete search history.

(56) References Cited

FOREIGN PATENT DOCUMENTS

| JP | 2008-213370 A | 9/2008 |
| KR | 10-2011-0122360 A | 11/2011 |
| KR | 10-2011-0126856 A | 11/2011 |
| KR | 10-1367981 B1 | 3/2014 |
| KR | 10-2034249 B1 | 10/2019 |
| KR | 10-2057673 B1 | 12/2019 |

OTHER PUBLICATIONS

International Search Report for PCT/KR2021/006426 mailed Sep. 6, 2021 from Korean Intellectual Property Office.

*Primary Examiner* — Anthony J Green
(74) *Attorney, Agent, or Firm* — Revolution IP, PLLC

(57) ABSTRACT

A method of manufacturing environmentally friendly interior and exterior building materials, includes: preparing agricultural waste of a lignocellulose-containing herbaceous plant; and subjecting the agricultural waste to immersion treatment using a functional immersion solution prepared by mixing purified water, an organic acid or an alkali salt thereof, and a composite natural extract and stirring the mixture.

8 Claims, 4 Drawing Sheets

METHOD OF MANUFACTURING ENVIRONMENTALLY FRIENDLY INTERIOR AND EXTERIOR BUILDING MATERIALS USING AGRICULTURAL WASTE OF LIGNOCELLULOSE-CONTAINING HERBACEOUS PLANT AND MINERAL BINDER AND ENVIRONMENTALLY FRIENDLY INTERIOR AND EXTERIOR BUILDING MATERIALS MANUFACTURED BY THE SAME

TECHNICAL FIELD

The present invention relates to a method of manufacturing environmentally friendly interior and exterior building materials using agricultural waste of a lignocellulose-containing herbaceous plant and a mineral binder and environmentally friendly interior and exterior building materials which are manufactured by the same. More specifically, the present invention relates to a method of manufacturing environmentally friendly interior and exterior building materials, whose compressive strength, soundproofing, heat insulation, and incombustibility are enhanced using an environmentally friendly material including agricultural waste of a lignocellulose-containing herbaceous plant and a mineral binder, and environmentally friendly interior and exterior building materials which are manufactured by the same.

BACKGROUND ART

Various interior and exterior building materials have been manufactured in factories according to the purpose of fire prevention, flame retardance, weight lightening, high quality, price reduction, and the like.

Recently, as the standard of living has improved, housing culture has been upgraded, and interest in health has increased, conventional artificial materials such as steel or petrochemical products, which are used as various types of construction materials, interior materials, and flooring materials, are being gradually replaced with natural materials such as wood panel materials. Accordingly, demand for medium-density fibreboard (MDF) and particle board (PB) is rapidly increasing.

However, since green policies such as carbon dioxide emission restrictions and the like are advocated as important policies of the international community at the pan-national level to protect the global environment, logging regulations are becoming stricter, and accordingly, the international raw material price of wood materials is rising 10% or more every year, and stable supply and demand thereof is becoming more difficult. Therefore, there is an urgent need to develop alternative raw materials that are capable of partially or wholly substituting for raw materials of wood panel materials.

For example, as an alternative to wood materials or steel materials, interior and exterior building materials, which are mainly made of synthetic resins, are mainly used in general construction materials, furniture, or various daily necessities and have also been used as flooring materials, ceiling materials, sidewall materials, door frames, or the like. The interior and exterior building materials as an alternative to wood materials are excellent in design diversification and productivity, but there are problems such as poor appearance due to the heterogeneity of materials, distortion after construction due to a high thermal expansion coefficient, lack of elasticity, generation of gaps in connecting parts, bad odor and toxicity, and health problems caused by slow release of residual formaldehyde.

Meanwhile, in terms of recycling of resources due to the shortage of wood resources, studies to replace wood panel materials with new lignocellulose materials have been actively conducted. For example, there has been an attempt to replace wood materials which are perennial woody plants using agricultural waste to protect forest resources to prevent global warming. However, since the agricultural waste is mainly used as low value-added materials such as materials for feed, mushroom cultivation, compost, or roof covers, a need for research on the development of recycling methods and products that is able to create high added value is gradually increasing.

In addition, asbestos, rock wool, glass fiber, and the like, which are conventionally used as sound absorbing and thermal insulating materials for interior decoration for construction, have been pointed out in terms of components harmful to the human body and environmental pollution. Accordingly, there is a growing demand for the development of environmentally friendly natural materials that are not harmful to the human body.

The background art of the present invention is disclosed in Korean Registered Patent No. 10-1367981.

DISCLOSURE

Technical Problem

The present invention is directed to providing a method of manufacturing environmentally friendly interior and exterior building materials, which are not only beneficial to the human body due to no release of harmful substances but also have enhanced compressive strength, incombustibility, soundproofing, and heat insulation functions by using an environmentally friendly material including agricultural waste of a lignocellulose-containing herbaceous plant and a mineral binder, and environmentally friendly interior and exterior building materials which are manufactured by the same.

However, the objective of the present invention is not limited to the objective described above, and other objectives not described above will be clearly understood by those skilled in the art from the following description.

Technical Solution

One aspect of the present invention provides a method of manufacturing environmentally friendly interior and exterior building materials, which includes: preparing agricultural waste of a lignocellulose-containing herbaceous plant; subjecting the agricultural waste to immersion treatment using a functional immersion solution prepared by mixing purified water, an organic acid or an alkali salt thereof, and a composite natural extract and stirring the mixture; pulverizing the immersion-treated agricultural waste to prepare straw powder; mixing mineral powder, carbon fibers, and magnetic nanoparticles with a dispersion solution and stirring the mixture to prepare a first functional composite composition; mixing a metal peroxide, polyethylene glycol, and an additive and stirring the mixture to prepare a second functional composite composition; mixing purified water, the straw powder, the first functional composite composition, and mineral powder and stirring the mixture to prepare a base composition; mixing purified water, the base composition, the second functional composite composition, and a mineral activating solution and stirring the mixture to prepare a molding composition; and subjecting the molding composition to compression molding by a press-molding process using a mold, wherein the mineral powder includes at least one mineral of calcium, magnesium, manganese, iron, copper, phosphorus, zinc, sodium, potassium, and germanium, and the mineral activating solution is prepared by mixing a mineral liquid, an alkali salt, and deep ocean water.

According to an embodiment, the functional immersion solution may be prepared by mixing 15 to 40 wt % of an organic acid, 5 to 15 wt % of a composite natural extract obtained by mixing a Pinus koraiensis extract, a Juniperus chinensis extract, a Zanthoxylum schinifolium extract, and a Perilla Frutescens extract in a weight ratio of 1:1 to 1.5:1 to 1.5:1 to 2, and purified water as the balance and stirring the mixture.

According to an embodiment, the immersion treatment of the agricultural waste may include heating at pH 5.0 to 6.0 and 40 to 60° C. for 10 to 60 minutes.

According to an embodiment, the first functional composite composition may be prepared to include 20 to 40 wt % of mineral powder obtained by mixing quartz, sericite, tourmaline, alumina, halloysite, iron oxide, calcium oxide, and magnesium oxide in a weight ratio of 1:1 to 1.5:1 to 1.5:1 to 1.5:0.5 to 1:2 to 2.5:2 to 2.5:2 to 2.5, 5 to 10 wt % of carbon fibers, 5 to 10 wt % of magnetic nanoparticles, and a dispersant as the balance.

According to an embodiment, the magnetic nanoparticles may include at least one of manganese, iron, cobalt, nickel, platinum and aluminum nanoparticles, and some of the magnetic nanoparticles are surface-treated with an acidic solution, and the remainder is surface-treated with a basic solution.

According to an embodiment, the base composition may be prepared to include 40 to 70 wt % of the straw powder, 5 to 10 wt % of the first functional composite composition, 10 to 15 wt % of the mineral powder, and purified water as the balance, and the molding composition may be prepared to include, based on 100 parts by weight of the base composition, 1 to 3 parts by weight of the second functional composite composition, 3 to 5 parts by weight of the mineral activating solution, and 100 to 200 parts by weight of purified water.

According to an embodiment, the second functional composite composition may be prepared to include 10 to 20 wt % of a metal peroxide obtained by mixing potassium peroxide, sodium peroxide, and calcium peroxide in a weight ratio of 1:1:1, 1 to 5 wt % of silica gel, 1 to 5 wt % of aluminum oxide, 1 to 5 wt % of zeolite, and polyethylene glycol as the balance.

Another aspect of the present invention provides environmentally friendly interior and exterior building materials, which are manufactured by the above method.

Advantageous Effects

According to embodiments of the present invention, since an environmentally friendly material including straw powder prepared using agricultural waste of a lignocellulose-containing herbaceous plant and a mineral binder is used as a main material to manufacture interior and exterior building materials, environmentally friendly interior and exterior building materials, which are not only beneficial to the human body by suppressing harmful substances from being released but also have enhanced compressive strength, incombustibility, soundproofing, and heat insulation functions, can be provided.

In addition, since the environmentally friendly interior and exterior building materials are manufactured to include mineral powder, carbon fibers, and magnetic nanoparticles, the blockage of absorption of electromagnetic waves or harmful earth radiation, far-infrared radiation, geomagnetic effects, and the like are provided, and thus a comfortable environment can be provided to the user of the space in which the environmentally friendly interior and exterior building materials according to the present invention are installed.

Additionally, since agricultural waste is used in the form of straw powder after being subjected to immersion treatment using a functional immersion solution including an organic acid or an alkali salt thereof and a composite natural extract including a Pinus koraiensis extract, a Juniperus chinensis extract, a Zanthoxylum schinifolium extract, and a Perilla Frutescens extract, antimicrobial performance, disinfectant performance, and deodorization performance are enhanced to prevent decomposition, and thus environmentally friendly interior and exterior building materials, which have an enhanced lifetime, can be provided.

In addition, when the residue of the environmentally friendly interior and exterior building materials according to the present invention is crushed and then scattered on a flower bed, it can help plant growth and soil improvement, there is no secondary contamination resulting from waste, and it can be utilized as an inorganic fertilizer or the like.

MODES OF THE INVENTION

Figure 1:
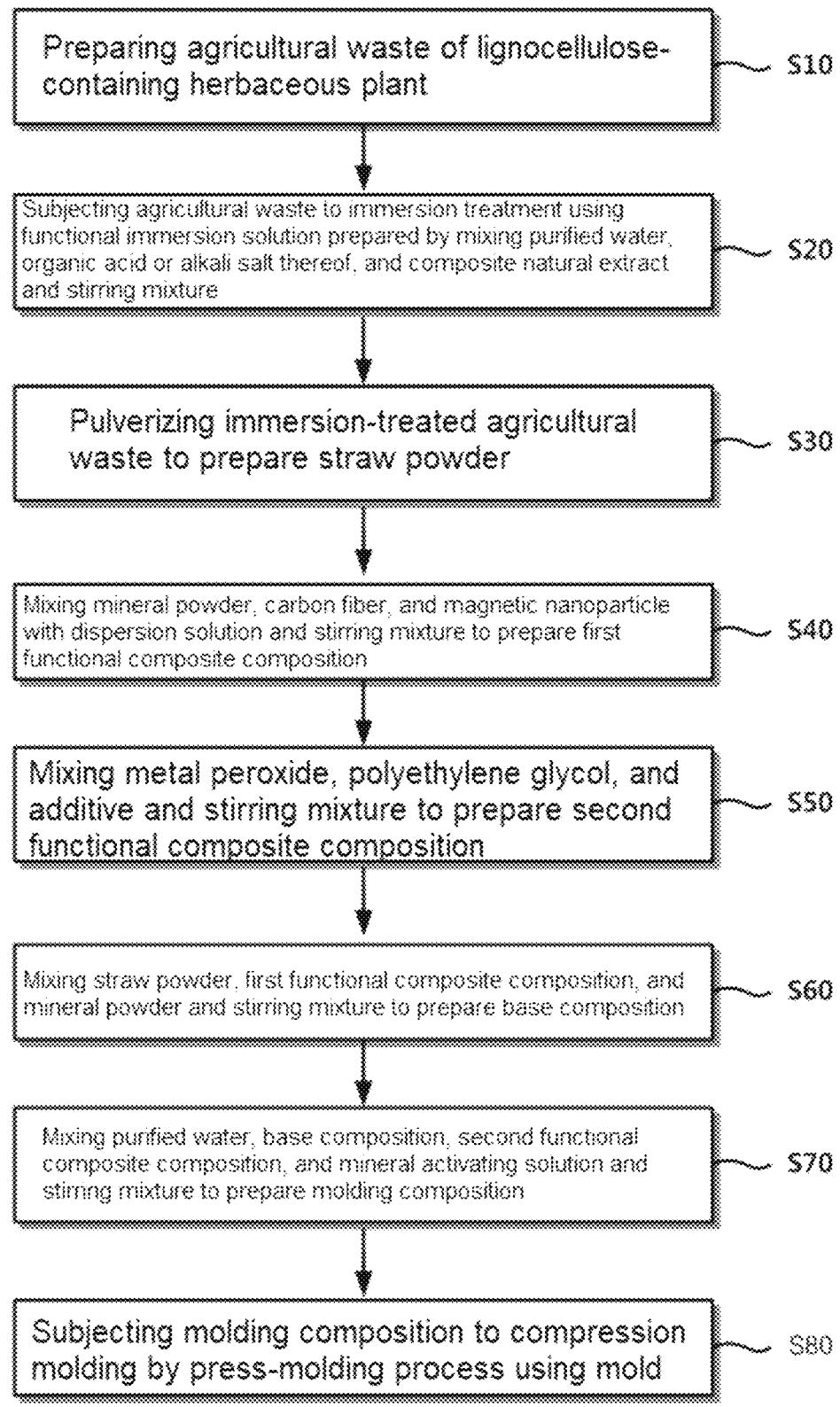
FIG. 1 is a flowchart of a method of manufacturing environmentally friendly interior and exterior building materials according to an embodiment of the present invention.

The present invention relates to a method of manufacturing environmentally friendly interior and exterior building materials and environmentally friendly interior and exterior building materials which are manufactured by the same and provides a method of manufacturing environmentally friendly interior and exterior building materials, which includes: preparing agricultural waste of a lignocellulose-containing herbaceous plant; subjecting the agricultural waste to immersion treatment using a functional immersion solution prepared by mixing purified water, an organic acid or an alkali salt thereof, and a composite natural extract and stirring the mixture; pulverizing the immersion-treated agricultural waste to prepare straw powder; mixing mineral powder, carbon fibers, and magnetic nanoparticles with a dispersion solution and stirring the mixture to prepare a first functional composite composition; mixing a metal peroxide, polyethylene glycol, and an additive and stirring the mixture to prepare a second functional composite composition; mixing purified water, the straw powder, the first functional composite composition, and mineral powder and stirring the mixture to prepare a base composition; mixing purified water, the base composition, the second functional composite composition, and a mineral activating solution and stirring the mixture to prepare a molding composition; and subjecting the molding composition to compression molding by a press-molding process using a mold.

Advantages and characteristics of the present invention, and methods for achieving them will be apparent with reference to embodiments described below in detail in conjunction with the accompanying drawings. However, the present invention is not limited to the exemplary embodiments to be described below and may be implemented in various forms. Therefore, the exemplary embodiments are provided to enable those skilled in the art to thoroughly understand the teaching of the present invention and to completely inform the scope of the present invention, and the present invention is only defined by the scope of the appended claims. Like reference numerals denote like elements throughout the descriptions.

In the specification, when a member is referred to as being "on" another member, this encompasses not only the case in which the two members are in contact with each another, but also the case in which the two members have a third member therebetween. In addition, in the specification, when a part is referred to as "containing," "including," "comprising," or "having" another component, it is to be understood that this does not exclude other components, but other components may be included as well, unless specifically stated otherwise.

As used herein, the term "about" or "substantially" is intended to have meanings close to numerical values or ranges specified with an allowable error and intended to prevent accurate or absolute numerical values disclosed for understanding of the present invention from being illegally or unfairly used by any unscrupulous third party.

Hereinafter, embodiments of the present invention will be described in detail with reference to the accompanying drawings.

FIG. 1 is a flowchart of a method of manufacturing environmentally friendly interior and exterior building materials according to an embodiment of the present invention.

Referring to FIG. 1, a method of manufacturing environmentally friendly interior and exterior building materials according to an embodiment of the present invention includes: preparing agricultural waste of a lignocellulose-containing herbaceous plant (S10); subjecting the agricultural waste to immersion treatment using a functional immersion solution prepared by mixing purified water, an organic acid or an alkali salt thereof, and a composite natural extract and stirring the mixture (S20); pulverizing the immersion-treated agricultural waste to prepare straw powder (S30); mixing mineral powder, carbon fibers, and magnetic nanoparticles with a dispersion solution and stirring the mixture to prepare a first functional composite composition (S40); mixing a metal peroxide, polyethylene glycol, and an additive and stirring the mixture to prepare a second functional composite composition (S50); mixing purified water, the straw powder, the first functional composite composition, and mineral powder and stirring the mixture to prepare a base composition (S60); mixing purified water, the base composition, the second functional composite composition, and a mineral activating solution and stirring the mixture to prepare a molding composition (S70); and subjecting the molding composition to compression molding by a press-molding process using a mold (S80).

Specifically, agricultural waste of a lignocellulose-containing herbaceous plant may be prepared (S10).

The lignocellulose-containing herbaceous plant may include herbaceous plants such as rice straw, wheat straw, corn cobs, sorghum cobs, soybean cobs, cotton cobs, barley straw, and the like, but the present invention is not limited thereto. The herbaceous plants are similar to woody raw materials and have the potential for replacing woody raw materials with natural raw materials containing a large amount of lignocellulose which is a composite material of cellulose and lignin. Agricultural waste is a waste product which is generated in production and processing processes of herbaceous plants and is difficult to use, and may be used in the present invention by removing foreign substances through washing and drying the resultant.

Since agricultural waste of rice straw, wheat straw, corn cobs, sorghum cobs, soybean cobs, cotton cobs, barley straw, and the like is easily obtainable in the surrounding area, it is easy to secure raw materials. Also, the lignocellulose-containing herbaceous plant may be used by selecting an herbaceous plant that has ease of acquisition according to the season. In the present invention, the use of agricultural waste of a plurality of herbaceous plants selected from rice straw, wheat straw, corn cobs, sorghum cobs, soybean cobs, cotton cobs, and barley straw is preferred.

The agricultural waste of a lignocellulose-containing herbaceous plant (hereinafter, simply referred to as agricultural waste) may be subjected to immersion treatment using a functional immersion solution prepared by mixing purified water, an organic acid or an alkali salt thereof, and a composite natural extract and stirring the mixture (S20).

In the present invention, the immersion treatment of the agricultural waste using a functional immersion solution not only prevents the decomposition of agricultural waste through antimicrobial and disinfectant treatment but also enhances the antimicrobial, disinfectant, and deodorization performance of the environmentally friendly interior and exterior building materials according to the present invention, and thus it may be used to prevent allergies, inflammation, atopic dermatitis, sick building syndrome, or the like.

The purified water may be used as a solvent for effectively dissolving or dispersing individual components of the functional immersion solution.

The organic acid may be used as a natural antimicrobial substance for a bacteriostatic effect rather than a bactericidal effect. For example, as the organic acid, a mixture of at least two selected from among acetic acid, citric acid, malic acid, lactic acid, and ascorbic acid may be used. As the alkali salt, an alkali metal salt or alkaline earth metal salt of the organic acid may be used. For example, the alkali salt may include a sodium salt, potassium salt, calcium salt, and the like of the organic acid.

The composite natural extract is intended to further enhance antimicrobial, disinfectant, and deodorization performance and may include a *Pinus koraiensis* extract, a *Juniperus chinensis* extract, a *Zanthoxylum schinifolium* extract, and a *Perilla Frutescens* extract.

*Pinus koraiensis* is also called Haesongja in Korea and belongs to the family Pinaceae. Pine nut seeds contain fat in the highest proportion at 68.2 to 74%, protein also accounts for a large portion at 16.4%, and the seeds contain other carbohydrate components, various inorganic salts of phosphorus, and are rich vitamins. *Pinus koraiensis* leaves contain alkaloid components such as pimecholine, piline, and the like. Also, *Pinus koraiensis* leaves contain a large amount of a terpene component like pine needles, and the terpene component is known to have useful functions of eliminating blood clots and having antioxidant activity.

These needles contain ascorbic acid, vitamins A, B, and K, bitter substances, flavonoids, and anthocyanins and also contain 7 to 12% of pine resin, 5% of tannin, carbohydrates, and essential oils.

*Juniperus chinensis* is a coniferous evergreen tree belonging to the family Cupressaceae and has a height of about 15 to 25 m and a scent all over its body. Juvenile *Juniperus chinensis* grows in a conical shape, and the trunk thereof is straight, but it twists and bends to suit the surrounding conditions as it ages. Components of *Juniperus chinensis* include amentoflavone, hinokiflavone, and apigenin, and the like and also include essential oils such as cedrol, pinene, and the like. Since ancient times, *Juniperus chinensis* has been used as medicines for blood circulation promotion, disinfection, detoxification, alleviation of fevers, colds, constipation, and various diseases, and there is ongoing research on the treatment of various diseases using *Juniperus chinensis* to date.

*Zanthoxylum schinifolium* serves to relieve pain by warming the inside and eliminating cold energy and dampness due to having a warm nature and has insecticidal and detoxificant effects. *Zanthoxylum schinifolium* contains about 7% essential oils, and particularly, geraniol, limonene, cumic alcohol, and the like are contained. Recently, it has been reported that essential oils extracted from *Zanthoxylum schinifolium* tree seeds have local anesthetic and analgesic effects and also have an antimicrobial effect to suppress *Escherichia coli*, dysentery bacilli, cocci, *Corynebacterium diphtheriae*, *Staphylococcus aureus*, dermatophytes, and the like.

*Perilla Frutescens* refers to the leaf and terminal branch of *Perilla frutescens* Britton var. *acuta* Kudo or other closely related cognate plants (the family Lamiaceae) and is a wrinkled and shriveled leaf and its fragment, and a thin stalk is sometimes called *Perilla* stalk. *Perilla Frutescens* is rich in vegetable vitamins, minerals, niacin, potassium, iron, magnesium, zinc, and the like and is also rich in anthocyanin-based pigments having a strong antioxidant function. Also, *Perilla Frutescens* is known to be useful for treatment of atopic dermatitis by containing aromatic substances and β-carotene and have excellent moisturizing and disinfectant/preservative effects.

The *Pinus koraiensis* extract, *Juniperus chinensis* extract, *Zanthoxylum schinifolium* extract, and *Perilla Frutescens* extract refer to extracts extracted from the individual plant's organs (e.g., root, branch, stalk, leaf, or flower) by an expert in the art through a typical extraction method, and the extraction site is not limited to a specific part. Individual extracts may be used in the form of liquid.

In the present invention, the composite natural extract may be preferably obtained by mixing a *Pinus koraiensis* extract, a *Juniperus chinensis* extract, a *Zanthoxylum schinifolium* extract, and a *Perilla Frutescens* extract in a weight ratio of 1:1 to 1.5:1 to 1.5:1 to 2 to maximize antimicrobial, disinfectant, and deodorization functions.

According to an embodiment, the functional immersion solution may be prepared by mixing 15 to 40 wt % of an organic acid, 5 to 15 wt % of a composite natural extract, and purified water as the balance and stirring the mixture. When the content of the organic acid or alkali salt thereof is less than 15 wt %, an antimicrobial effect may be insignificant, and when the organic acid or alkali salt thereof is included in an excessive amount of more than 40 wt %, solubility may be degraded. Also, when the content of the composite natural extract is less than 5 wt %, it may be difficult to obtain desired extract effects, and when the content of the composite natural extract exceeds 15 wt %, the storage stability of the functional immersion solution may be degraded, and costs may increase in terms of economic feasibility.

The immersion treatment of the agricultural waste may include immersing the agricultural waste in the functional immersion solution and then heating at pH 5.0 to 6.0 and 40 to 60° C. for 10 to 60 minutes. When a pH in the immersion is less than 5.0 or more than 6.0, the functional immersion solution may not be sufficiently absorbed (or not sufficiently penetrate), so attention needs to be paid. Also, when an immersion temperature is less than 40° C., the functional immersion solution may not be sufficiently absorbed. When an immersion temperature exceeds 60° C., the stability of the absorbed functional immersion solution may be degraded, so it is preferable to maintain the above range. When the immersion is performed for a short time of less than 10 minutes, the functional immersion solution may not be sufficiently absorbed into the agricultural waste, and when the immersion is performed for a long time of more than 60 minutes, the absorbed functional immersion solution may flow out again, and thus it may be difficult to expect sufficient effects. The immersion-treated agricultural waste may be dehydrated and air-dried, and the above-described immersion, dehydration, and drying processes may be repeatedly performed several times.

The immersion-treated agricultural waste of a lignocellulose-containing herbaceous plant may be pulverized to prepare straw powder (S30).

For example, the agricultural waste of a lignocellulose-containing herbaceous plant may be pulverized to have a particle size of 1 to 10 mm. When the particle size of straw powder is less than 1 mm, the process of pulverizing the agricultural waste may become complicated to degrade process efficiency, and when the particle size of straw powder exceeds 10 mm, moldability may be degraded.

Mineral powder, carbon fibers, and magnetic nanoparticles may be mixed with a dispersion solution and stirred to prepare a first functional composite composition (S40).

The mineral powder may be prepared by firing and pulverizing a plurality of minerals selected from quartz, sericite, tourmaline, alumina, halloysite, iron oxide, calcium oxide, and magnesium oxide. In the present invention, the mineral powder may be used not only as a material for absorbing electromagnetic waves and harmful earth radiation but also for far-infrared radiation and antimicrobial effects.

The firing of the mineral may be performed at least two times. For example, a first firing process may be performed at 800 to 900° C. before mineral pulverization, and a second firing process may be performed at 1000 to 1300° C. after mineral pulverization. Also, the mineral may be pulverized to have a particle size of 500 to 1000 mesh. Since the mineral powder is prepared through a first firing process, pulverization, and a second firing process, the neutralization of absorption of electromagnetic waves and harmful earth radiation, far-infrared radiation, and antimicrobial effects of the mineral powder can be further enhanced.

According to an embodiment, the mineral powder may be prepared by mixing quartz, sericite, tourmaline, alumina, halloysite, iron oxide, calcium oxide, and magnesium oxide in a weight ratio of 1:1 to 1.5:1 to 1.5:0.5 to 1:2 to 2.5:2 to 2.5:2 to 2.5.

The carbon fibers are intended for far-infrared radiation and an antimicrobial effect and may be used after being pulverized to have a length of 1 to 5 mm.

For example, the carbon fibers may be prepared by mixing thermosetting resin powder with a small amount of additives (antimicrobial agent, mineral powder, etc.) to prepare a raw material mixture and forming the prepared raw material mixture into a fiber shape by a known method. The thermosetting resin powder, which is a carbon source of carbon fibers, is a raw material that is carbonized by a carbonization process and thus changed into activated carbon fibers. Although all conventional carbon compounds are usable, it may be preferable to use a compound capable of providing process stability and minimizing an impurity content in the obtained carbon fibers. As a compound that is not deformed even during sintering or carbonization and has a low impurity content, for example, a novolac-type phenolic resin may be used. However, the present invention is not limited thereto, and various types of thermosetting resins may be used in addition to the novolac-type phenolic resin.

The magnetic nanoparticles include at least one of manganese, iron, cobalt, nickel, platinum, and aluminum nanoparticles, and some of the magnetic nanoparticles may be surface-treated with an acidic solution, and the remainder may be surface-treated with a basic solution.

For example, the magnetic nanoparticles may be prepared by synthesizing nanoparticles using a known synthesis method and then performing pulverization and surface treatment. In the synthesis of nanoparticles, a sintering method of mixing components to be synthesized and sintering the mixture under constant conditions, a co-precipitation firing method of washing, drying, and thermally treating a precipitate obtained by mixing metal ion-containing particles with an alkali aqueous solution, or a hydrothermal synthesis method using high temperature boiling water may be used, and various other synthesis methods may be used.

The synthesized nanoparticles may be pulverized to have a particle size of 50 to 100 nm. The pulverization of the synthesized nanoparticles may be performed, for example, using a bead mill, a mixer, a homogenizer, or an ultrasonic cleaner. The nanoparticles synthesized by such a physical pulverization method may have a small particle size of 50 to 100 nm and a uniform size distribution.

The pulverized nanoparticles may be surface-treated by a chemical treatment method using an acidic or basic solution. For example, some of the pulverized nanoparticles may be surface-treated with an acidic solution, and the remainder may be surface-treated with a basic solution. The acidic solution may include at least one of hydrochloric acid (HCl), acetic acid ($CH_3COOH$), sulfuric acid ($H_2SO_4$), sulfurous acid ($H_2SO_3$), nitric acid ($HNO_3$), phosphoric acid ($H_3PO_4$), formic acid (HCOOH), ascorbic acid ($C_6H_8O_6$), boric acid ($H_3BO_3$), and silicic acid ($H_2SiO_3$). The basic solution may include at least one of ammonia ($NH_3$), ammonium hydroxide ($NH_4OH$), magnesium hydroxide (Mg(OH)), potassium hydroxide (KOH), calcium hydroxide ($Ca(OH)_2$), sodium hydroxide (NaOH), barium hydroxide ($Ba(OH)_2$), aluminum hydroxide ($Al(OH)_3$), iron hydroxide ($Fe(OH)_2$), sodium hydrogen carbonate ($NaHCO_3$), sodium carbonate (NaCO), calcium carbonate ($CaCO_3$), and potassium carbonate ($K_2CO_3$). Through the surface treatment of the pulverized nanoparticles, electrical properties and the degree of dispersibility may be enhanced. The surface-treated nanoparticles may be obtained as magnetic nanoparticles after being separated using a magnetic, washed, and dried.

In the present invention, the magnetic nanoparticles may be used for a geomagnetic (or very low frequency) effect. For example, modern people who live in cars or high-rise buildings such as apartments and the like do not receive magnetic energy from the ground, which adversely affects the balance of the human body. However, when the environmentally friendly interior and exterior building materials according to an embodiment of the present invention are used, a very low frequency (geomagnetic) effect can be exhibited through molecular movement (alternation of N and S poles) in the material itself, and thus magnetic deficiency syndrome can be prevented, energy can be supplied to vitalize life, and it can help relieve fatigue and stress.

As the dispersant, an aqueous dispersant consisting of an aqueous polymer may be used. The dispersant may include at least one solvent of water, a hydrophilic alcohol-based solvent, an aldehyde-based solvent, an ester-based solvent, and a ketone-based solvent and at least one aqueous polymer of polyvinylpyrrolidone, polyvinyl alcohol, polyethylene glycol, polyethylene oxide, polyaspartic acid, alginic acid, chitosan, hyaluronic acid, polyetherimide, and carboxymethylcellulose.

According to an embodiment, the first functional composite composition may be prepared to include 20 to 40 wt % of mineral powder, 5 to 10 wt % of carbon fibers, 5 to 10 wt % of magnetic nanoparticles, and a dispersant as the balance. When mineral powder, carbon fibers, and magnetic nanoparticles are mixed in the above-described weight ratio, the above-described effects can be further enhanced. For example, when the contents of mineral powder, carbon fibers, and magnetic nanoparticles are less than the lower limits of the above ranges, individual effects may not be sufficiently exhibited, and when the contents exceed the upper limits of the above ranges, costs relative to an increase in effects may excessively increase, and moldability may be degraded.

A metal peroxide, polyethylene glycol, and an additive may be mixed and stirred to prepare a second functional composite composition (S50).

In the present invention, the second functional composite composition is intended to enhance the function of a mineral binder to be described below as a binder and may serve to assist the ionic reaction of a mineral binder by providing oxygen ions. This will be described below.

The metal peroxide is a main raw material that provides oxygen ions, and an environmentally friendly and inexpensive metal peroxide may be used. For example, the metal peroxide may include at least one of potassium peroxide ($K_2O_2$), sodium peroxide ($NaO_2$), and calcium peroxide ($CaO_2$).

The polyethylene glycol may be used as a solvent for dispersing the metal peroxide.

The additive is a substance added to stably induce the generation of oxygen ions from the metal peroxide. For example, the additive may include at least one of silica gel, aluminum oxide, and zeolite. Silica gel and aluminum oxide may function as moisture removers, and zeolite may serve to prevent a moisture remover such as silica gel, aluminum oxide, or the like from directly reacting with the metal peroxide and function as a stabilizer that allows the metal peroxide and the moisture remover to be stably present.

According to an embodiment, the second functional composite composition may be prepared to include 10 to 20 wt % of a metal peroxide obtained by mixing potassium peroxide ($K_2O_2$), sodium peroxide ($NaO_2$), and calcium peroxide ($CaO_2$) in a weight ratio of 1:1:1, 1 to 5 wt % of silica gel, 1 to 5 wt % of aluminum oxide, 1 to 5 wt % of zeolite, and polyethylene glycol as the balance. When the second functional composite composition is prepared by mixing in the above-described weight ratio, the function of the second functional composite composition can be further enhanced.

Purified water, the straw powder, the first functional composite composition, and mineral powder may be mixed and stirred to prepare a base composition (S60).

The mineral powder functions as a binder by reacting with a mineral activating solution to be described below. For example, the mineral powder may include at least one mineral of calcium, magnesium, manganese, iron, copper, phosphorus, zinc, sodium, potassium, and germanium. The mineral powder may be prepared by a known method, or commercially available products may be purchased and used.

According to an embodiment, the base composition may be prepared to include 40 to 70 wt % of the straw powder, 5 to 10 wt % of the first functional composite composition, 10 to 15 wt % of mineral powder, and purified water as the balance. When the content of the straw powder is less than 40 wt %, strength as interior and exterior materials may be degraded, and when the content of the straw powder exceeds 70 wt %, moldability may be degraded. Also, when the first functional composite composition is added in the above-described range, the effect of the first functional composite composition relative to costs can be enhanced. When the content of mineral powder is less than 10 wt %, the function as a binder may be degraded, and when the content of mineral powder exceeds 15 wt %, the effects of other components may not be exhibited.

Purified water, the base composition, the second functional composite composition, and a mineral activating solution may be mixed and stirred to prepare a molding composition (S70).

According to an embodiment, the mineral activating solution may be prepared by mixing a mineral liquid, an alkali salt, and deep ocean water. In this case, the mineral liquid may be a mineral liquid obtained by dissolving at least one mineral of calcium, magnesium, manganese, iron, copper, phosphorus, zinc, sodium, potassium and germanium in water (i.e., purified water). The alkali salt may include potassium chloride, potassium carbonate, or magnesium chloride, but the present invention is not limited thereto. The deep ocean water is a useful seawater resource that is present on the seabed at a depth of 200 m or more where sunlight does not reach so that there is almost no organic matter or pathogens, stably maintains a low temperature throughout the year, is rich in various types of minerals and nutrient salts essential for the growth of marine plants, and is aged for a long period of time. For example, the mineral activating solution may be prepared to include, based on 100 parts by weight of a mineral liquid, 10 to 20 parts by weight of an alkali salt and 5 to 10 parts by weight of deep ocean water.

In the molding composition, the mineral activating solution may function as a mineral binder along with the mineral powder. The mineral binder is a substance that functions as a binder by a reaction between a mineral and a solution and contributes to controlling the structure of a binding body by being converted into a ceramic by itself. In other words, mineral powder harmless to the human body and a mineral activating solution (i.e., a liquid mixture of a mineral liquid, an alkali salt, and deep ocean water) are mixed to form a liquid mineral binder, and the mineral binder may function as an environmentally friendly mineral binder that hardens the molding composition through the binding of its cations (e.g., calcium ions, magnesium ions, manganese ions, iron ions, copper ions, phosphorus ions, zinc ions, sodium ions, potassium ions, germanium ions, etc.) and anions (e.g., oxygen ions) by an ionic reaction.

For example, the mineral binder may serve to increase not only adhesive strength during a molding process using the molding composition but also strength after molding by enhancing adhesion among the straw powder, mineral powder, carbon fibers, and magnetic nanoparticles of the base composition.

The mineral activating solution may serve as a catalyst of the above-described ionic reaction, and the second functional composite composition may promote the above-described ionic reaction by generating oxygen ions in the molding composition, thereby increasing binding affinity of the mineral binder.

According to an embodiment, the molding composition may be prepared to include, based on 100 parts by weight of the base composition, 1 to 3 parts by weight of the second functional composite composition, 3 to 5 parts by weight of the mineral activating solution, and 100 to 200 parts by weight of purified water. When the second functional composite composition and the mineral activating solution are added in the above-described weight ratio, individual effects can be sufficiently exhibited.

The molding composition may be subjected to compression molding by a press-molding process using a mold (S80).

The molding composition of the present invention enables the manufacture of interior and exterior building materials using various molds because the composition is able to be fired at low temperature and has excellent moldability. For example, the compression molding of the molding composition may be performed at 80 to 120° C., the mineral binder contained in the molding composition during the compression molding is hardened to induce binding of components, and interior and exterior materials may be manufactured according to the shape of the mold.

Afterwards, subsequent processes such as drying, polishing, cutting, and the like may be performed to complete the manufacture of environmentally friendly interior and exterior building materials.

Figure 2:
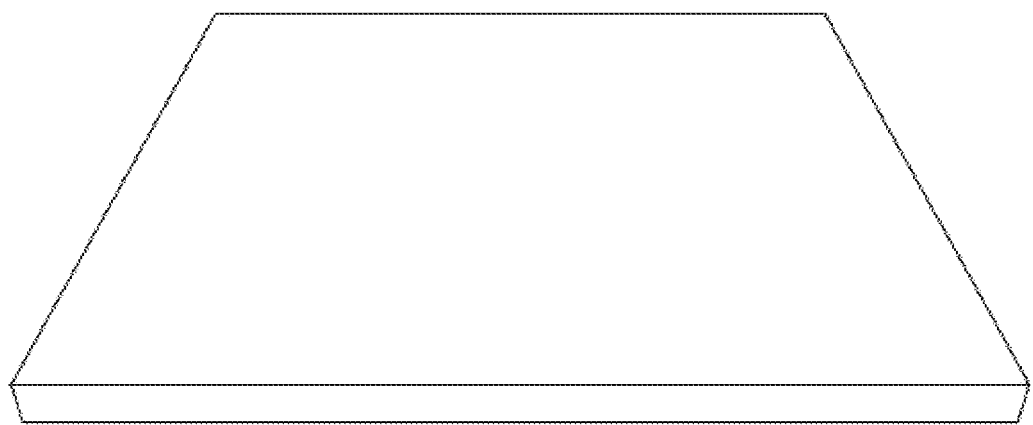
FIGS. 2 to 4 are images showing environmentally friendly interior and exterior building materials, which are manufactured by methods of manufacturing environmentally friendly interior and exterior building materials according to embodiments of the present invention.
Figure 3:
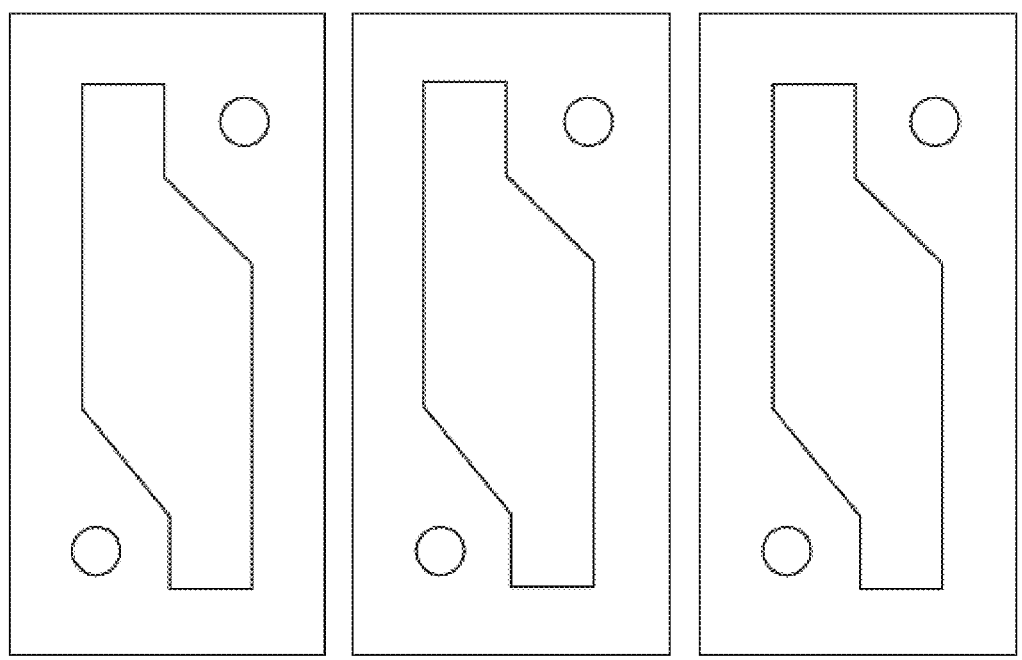
Figure 4:
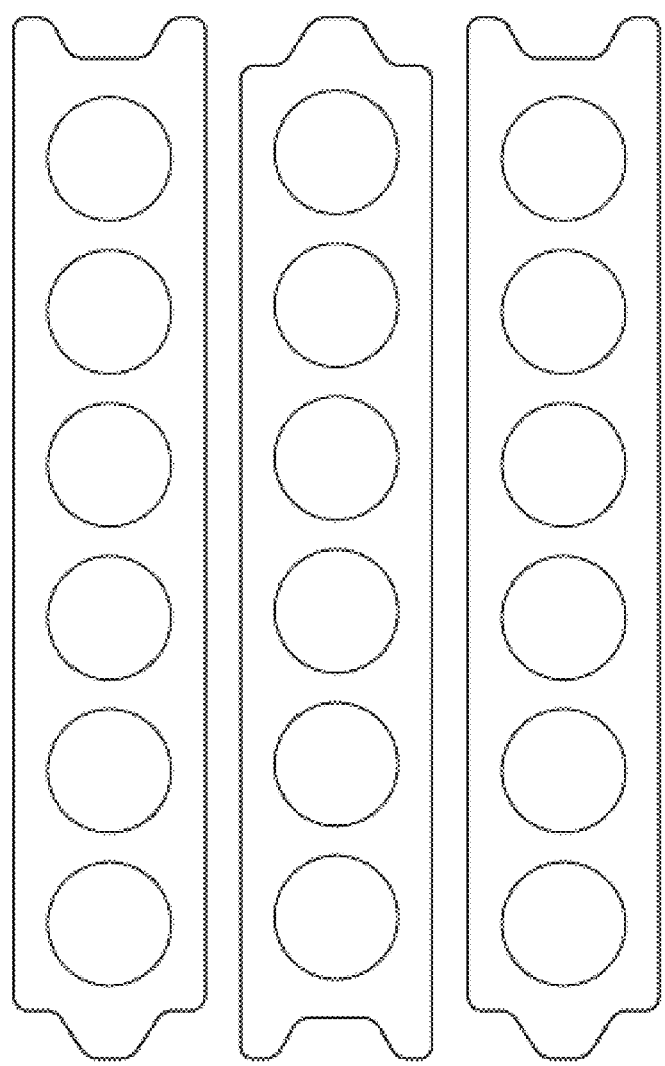

The environmentally friendly interior and exterior building materials, which are manufactured as described above, may be manufactured in the form of a panel shown in FIG. 2 or a block shown in FIGS. 3 and 4 and thus may be used as various construction materials. In this case, FIGS. 2 to 4 are images showing environmentally friendly interior and exterior building materials which are manufactured by methods of manufacturing environmentally friendly interior and exterior building materials according to embodiments of the present invention.

According to embodiments of the present invention, since an environmentally friendly material including straw powder prepared using agricultural waste of a lignocellulose-containing herbaceous plant and a mineral binder is used as a main material to manufacture interior and exterior building materials, environmentally friendly interior and exterior building materials, which are not only beneficial to the human body by suppressing harmful substances from being released but also have enhanced compressive strength, incombustibility, soundproofing, and heat insulation functions, can be provided.

In addition, since the environmentally friendly interior and exterior building materials are manufactured to include mineral powder, carbon fibers, and magnetic nanoparticles, the blockage of absorption of electromagnetic waves or harmful earth radiation, far-infrared radiation, geomagnetic effects, and the like are provided, and thus a comfortable environment can be provided to the user of the space in which the environmentally friendly interior and exterior building materials according to the present invention are installed.

Additionally, since agricultural waste is used in the form of straw powder after being subjected to immersion treatment using a functional immersion solution including an organic acid or an alkali salt thereof and a composite natural extract including a *Pinus koraiensis* extract, a *Juniperus chinensis* extract, a *Zanthoxylum schinifolium* extract, and a *Perilla Frutescens* extract, antimicrobial performance, disinfectant performance, and deodorization performance are enhanced to prevent decomposition, and thus environmentally friendly interior and exterior building materials, which have an enhanced lifetime, can be provided.

In addition, when the residue of the environmentally friendly interior and exterior building materials according to the present invention is crushed and then scattered on a flower bed, it can help plant growth and soil improvement, there is no secondary contamination resulting from waste, and it can be utilized as an inorganic fertilizer or the like.

Although embodiments of the present invention have been described with reference to the accompanying drawings, those skilled in the art will understood that the present invention may be embodied in many different forms without change or modification of the technical spirit or essential characteristics of the present invention. Therefore, it should be understood that the aforementioned embodiments are only provided by way of example and not provided to limit the present invention.

The invention claimed is:

1. A method of manufacturing environmentally friendly interior and exterior building materials, the method comprising:
    preparing agricultural waste of a lignocellulose-containing herbaceous plant;
    subjecting the agricultural waste to immersion treatment using a functional immersion solution prepared by mixing purified water, an organic acid or an alkali salt thereof, and a composite natural extract and stirring the mixture;
    pulverizing the immersion-treated agricultural waste to prepare straw powder;
    mixing mineral powder, carbon fibers, and magnetic nanoparticles with a dispersion solution and stirring the mixture to prepare a first functional composite composition;
    mixing a metal peroxide, polyethylene glycol, and an additive and stirring the mixture to prepare a second functional composite composition;
    mixing purified water, the straw powder, the first functional composite composition, and mineral powder and stirring the mixture to prepare a base composition;
    mixing purified water, the base composition, the second functional composite composition, and a mineral activating solution and stirring the mixture to prepare a molding composition; and
    subjecting the molding composition to compression molding by a press-molding process using a mold,
    wherein the mineral powder includes at least one mineral of calcium, magnesium, manganese, iron, copper, phosphorus, zinc, sodium, potassium, and germanium, and
    the mineral activating solution is prepared by mixing a mineral liquid, an alkali salt, and deep ocean water.

2. The method of claim 1, wherein the functional immersion solution is prepared by mixing 15 to 40 wt % of an organic acid, 5 to 15 wt % of a composite natural extract obtained by mixing a *Pinus koraiensis* extract, a *Juniperus chinensis* extract, a *Zanthoxylum schinifolium* extract, and a *Perilla Frutescens* extract in a weight ratio of 1:1 to 1.5:1 to 1.5:1 to 2, and purified water as the balance and stirring the mixture.

3. The method of claim 2, wherein the immersion treatment of the agricultural waste includes heating at pH 5.0 to 6.0 and 40 to 60° C. for 10 to 60 minutes.

4. The method of claim 2, wherein the first functional composite composition is prepared to include 20 to 40 wt % of mineral powder obtained by mixing quartz, sericite, tourmaline, alumina, halloysite, iron oxide, calcium oxide, and magnesium oxide in a weight ratio of 1:1 to 1.5:1 to 1.5:1 to 1.5:0.5 to 1:2 to 2.5:2 to 2.5:2 to 2.5, 5 to 10 wt % of carbon fibers, 5 to 10 wt % of magnetic nanoparticles, and a dispersant as the balance.

5. The method of claim 4, wherein the magnetic nanoparticles include at least one of manganese, iron, cobalt, nickel, platinum and aluminum nanoparticles, and some of the magnetic nanoparticles are surface-treated with an acidic solution, and the remainder is surface-treated with a basic solution.

6. The method of claim 4, wherein the base composition is prepared to include 40 to 70 wt % of the straw powder, 5 to 10 wt % of the first functional composite composition, 10 to 15 wt % of the mineral powder, and purified water as the balance, and
    the molding composition is prepared to include, based on 100 parts by weight of the base composition, 1 to 3 parts by weight of the second functional composite composition, 3 to 5 parts by weight of the mineral activating solution, and 100 to 200 parts by weight of purified water.

7. The method of claim 6, wherein the second functional composite composition is prepared to include 10 to 20 wt % of a metal peroxide obtained by mixing potassium peroxide, sodium peroxide, and calcium peroxide in a weight ratio of 1:1:1, 1 to 5 wt % of silica gel, 1 to 5 wt % of aluminum oxide, 1 to 5 wt % of zeolite, and polyethylene glycol as the balance.

8. Environmentally friendly interior and exterior building materials, which are manufactured by the method according to claim 1.

* * * * *